(12) United States Patent
Vercruysse

(10) Patent No.: US 12,031,899 B2
(45) Date of Patent: Jul. 9, 2024

(54) RADIATION CARRIER AND USE THEREOF IN AN OPTICAL SENSOR

(71) Applicant: IMEC VZW, Leuven (BE)

(72) Inventor: Dries Vercruysse, Sint-Andries (BE)

(73) Assignee: Imec vzw, Leuven (BE)

( * ) Notice: Subject to any disclaimer, the term of this patent is extended or adjusted under 35 U.S.C. 154(b) by 142 days.

(21) Appl. No.: 17/102,388

(22) Filed: Nov. 23, 2020

(65) Prior Publication Data

US 2021/0072141 A1  Mar. 11, 2021

Related U.S. Application Data

(62) Division of application No. 15/580,674, filed as application No. PCT/EP2016/065394 on Jun. 30, 2016, now abandoned.

(30) Foreign Application Priority Data

Jun. 30, 2015 (EP) .................................... 15174678

(51) Int. Cl.
*G01N 15/1434* (2024.01)
*F21V 8/00* (2006.01)
(Continued)

(52) U.S. Cl.
CPC ..... *G01N 15/1436* (2013.01); *G01N 15/1434* (2013.01); *G01N 15/1484* (2013.01);
(Continued)

(58) Field of Classification Search
CPC ........... G01N 15/1434; G01N 15/1436; G01N 15/1484; G01N 2015/1006;
(Continued)

(56) References Cited

U.S. PATENT DOCUMENTS

| 4,351,611 A | 9/1982 | Leif |
| 4,906,094 A | 3/1990 | Ashida |

(Continued)

FOREIGN PATENT DOCUMENTS

| DE | 42 15 908 A1 | 11/1993 |
| EP | 0266120 A2 | 5/1988 |
| WO | 2004040319 A1 | 5/2004 |

OTHER PUBLICATIONS

PCT International Search Report and Written Opinion; PCT International Application No. PCT/EP2016/065394, dated Sep. 14, 2016, 18 pages.

(Continued)

*Primary Examiner* — Tri T Ton
(74) *Attorney, Agent, or Firm* — McDonnell Boehnen Hulbert & Berghoff LLP

(57) ABSTRACT

A radiation carrier for carrying at least a radiation beam has, on a surface thereof, at least one excitation grating, for directing at least an excitation radiation beam directionally out of the radiation carrier, thereby illuminating a region of interest; and at least one structure for redirecting emission radiation emanating from the region of interest. Further a sensor is provided comprising at least one such radiation carrier and at least one detector, the structure being adapted for redirecting radiation from the region of interest into the at least one detector.

10 Claims, 3 Drawing Sheets

(51) Int. Cl.
*G01N 15/14* (2006.01)
*G01N 21/64* (2006.01)
*G01N 21/65* (2006.01)
*G02B 6/124* (2006.01)
*G02B 6/30* (2006.01)
*G01N 15/10* (2006.01)
*G01N 21/03* (2006.01)

(52) U.S. Cl.
CPC ....... *G01N 21/6428* (2013.01); *G01N 21/645* (2013.01); *G01N 21/65* (2013.01); *G02B 6/0036* (2013.01); *G02B 6/124* (2013.01); *G02B 6/30* (2013.01); *G01N 2015/1006* (2013.01); *G01N 2021/0346* (2013.01); *G01N 2021/6463* (2013.01); *G01N 2021/6482* (2013.01)

(58) Field of Classification Search
CPC ... G01N 2021/0346; G01N 2021/6463; G01N 2021/6482; G01N 21/6428; G01N 21/645; G01N 21/65; G01N 15/14; G01N 21/51; G01N 21/64; G02B 6/001; G02B 6/0026; G02B 6/0036; G02B 6/124; G02B 6/34; G02B 6/30; G02F 1/133382; G02F 1/133385; G02F 1/133628; G02F 2201/36; H05K 7/20972
See application file for complete search history.

(56) References Cited

U.S. PATENT DOCUMENTS

| | | |
|---|---|---|
| 5,303,316 A | 4/1994 | Hammer |
| 5,999,256 A | 12/1999 | Jones et al. |
| 6,198,869 B1 * | 3/2001 | Kraus ................ G01N 21/7703 356/417 |
| 7,973,933 B2 * | 7/2011 | Homola ............... G01N 21/553 356/445 |
| 8,107,168 B2 | 1/2012 | Murnan et al. |
| 8,274,040 B2 * | 9/2012 | Zhong .............. G01N 33/54373 250/559.4 |
| 8,618,508 B2 * | 12/2013 | Wimberger-Friedl ....................... G01N 21/6428 250/459.1 |
| 8,980,550 B2 | 3/2015 | Malik |
| 2001/0046045 A1 * | 11/2001 | Dong ................... A61B 5/0059 356/317 |
| 2002/0093641 A1 | 7/2002 | Ortyn et al. |
| 2004/0057050 A1 | 3/2004 | Beck et al. |
| 2005/0105077 A1 | 5/2005 | Padmanabhan |
| 2008/0268469 A1 | 10/2008 | Srienc et al. |
| 2009/0071225 A1 | 3/2009 | Schilffarth |
| 2009/0079978 A1 | 3/2009 | Kimura |
| 2011/0164249 A1 * | 7/2011 | Innami ................ G01N 21/645 356/326 |
| 2013/0037726 A1 | 2/2013 | Kiesel et al. |
| 2018/0188152 A1 | 7/2018 | Vercruysse |
| 2019/0391067 A1 | 12/2019 | Vercruysse et al. |

OTHER PUBLICATIONS

Summers, Huw D. et al., "Cytometric Biochips with Optically Active Surfaces for Spatial Engineering of Fluorescence Excitation", Optomechatronic Micro/Nano Devices and Components III, Proc. of SPIE, vol. 6886, Oct. 8-10, 2008, pp. 688603-1-688603-9.
Non-Final Office Action received for U.S. Appl. No. 15/580,674, mailed on Aug. 26, 2019, 11 pages.
Final Office Action received for U.S. Appl. No. 15/580,674, mailed on Dec. 19, 2019, 8 Pages.
Non-Final Office Action received for U.S. Appl. No. 15/580,674, mailed on Apr. 2, 2020, 7 pages.
Final Office Action received for U.S. Appl. No. 15/580,674, mailed on Aug. 21, 2020, 9 Pages.
Advisory Action received for U.S. Appl. No. 15/580,674, mailed on Nov. 4, 2020, 3 Pages.

* cited by examiner

RADIATION CARRIER AND USE THEREOF IN AN OPTICAL SENSOR

CROSS-REFERENCE TO RELATED APPLICATION

The present application is a divisional of U.S. application Ser. No. 15/580,674, filed on Dec. 7, 2017 (now abandoned), which is a national stage entry of PCT/EP2016/065394 filed Jun. 30, 2016, which claims priority to European Patent Application No. 15174678.1 filed Jun. 30, 2015, the contents of which are hereby incorporated by reference.

FIELD OF THE DISCLOSURE

The present disclosure relates to the field of particle detection and optionally analysis. More specifically it relates to particle detection and optionally analysis via optical means. In particular, it relates to luminescence based detection, e.g. fluorescence based detection, of particles or detection of particles based on Raman scattering, in flow.

BACKGROUND

Cytometry, in particular flow cytometry, consists in identification of analytes (e.g. tumor cells) based on morphological and/or chemical characteristics. In the latter case, markers, e.g. luminescent markers such as for instance fluorescent markers, are often used to label particular molecules, such as proteins, that can identify the cell. This typically requires an optical system that focuses laser light to excite the luminophores, e.g. fluorophores, and that collects and filters the luminescence, e.g. fluorescence, coming from the cell.

Luminescent, e.g. fluorescent, detection of particles is a technique whereby a particle of interest in a fluid sample is stained or labeled with one or more luminophores, e.g. fluorophores. To detect the particle, the luminophores, e.g. fluorophores, attached to the particle are activated by a light signal and luminescence, e.g. fluorescence, from the luminophores, e.g. fluorophores, is then detected by an optical detector. During the phase of staining or labeling the particle, a number of luminophores, e.g. fluorophores, bind to the particle, and a remaining number of luminophores, e.g. fluorophores, do not bind. In existing devices, the remaining number of unbound luminophores, e.g. fluorophores, have to be removed before activating the luminophores, e.g. fluorophores, bound to the particle, because the background noise reduces the sensibility of the detectors, which typically have low resolution. These additional steps of removal of unbound markers increase the complexity of the process and the area needed for washing the markers off as well as controllable pumps and other elements for flow control, typically making the devices bulky.

Even simple cell counting tests require a lot of throughput. To perform cell counting, cells need to flow through the system very fast, which means that only little signals are available from every single cell. Hence extremely sensitive systems that require fine alignment of the laser and the optical systems are required.

In order to manipulate the laser input, waveguides are often used. However, the breadth of the frequency spectrum of luminescent, e.g. fluorescent, light (broadband spectrum) hinders or impedes an efficient input in a waveguide.

SUMMARY

It is an object of embodiments of the present disclosure to provide a compact and easy to use optical sensor and analyzer, for performing luminescent, for instance fluorescent, or Raman scattering detection.

In an aspect, the present disclosure provides a radiation carrier for a sensor, the radiation carrier being adapted for carrying at least a radiation beam, the radiation carrier comprising a surface. The radiation carrier comprises at least one excitation grating on the surface of the at least one radiation carrier, positioned and adapted to couple an excitation radiation beam directionally out of the radiation carrier, thereby illuminating a region of interest (ROI), and further at least one structure positioned and adapted for redirecting, for instance for receiving and redirecting, such as for collecting and redirecting, e.g. for reflecting, emission radiation emanating from the region of interest. Emission radiation emanating from the region of interest may be excitation radiation which is for instance simply reflected on e.g. particles present in the region of interest, or may be a type of radiation different from the excitation radiation, which is generated in the region of interest, by interaction of the excitation radiation with particles present in the region of interest, such as for instance fluorescence or phosphorescence radiation.

In embodiment of the present disclosure, the structure for redirecting emission radiation may be a structure for reflecting emission radiation. Alternatively, the structure for redirecting emission radiation may be a structure for transmitting the emission radiation. The structure for redirecting emission radiation may include a structured or patterned surface.

In embodiments of the present disclosure, the at least one structure for redirecting emission radiation may be at least one emission grating adapted for reflecting emission radiation to a detector. In alternative embodiments, it may be at least one emission grating adapted for coupling emission radiation into a radiation carrier. This radiation carrier may be the radiation carrier for carrying the radiation beam, or it may be another, second, radiation carrier. The second radiation carrier may be positioned in the plane of the radiation carrier for carrying the radiation beam, or angled, for instance substantially perpendicular, thereto.

In yet alternative embodiments, the at least one structure positioned and adapted for redirecting emission radiation comprises planar optics, such as for instance a planar lens.

In example embodiments, a cheap, disposable radiation carrier can be obtained with inexpensive materials. In some embodiments, the radiation carrier comprises planar optics, for producing a spread radiation beam and directing it towards the region of interest. In example embodiments of the present disclosure, a compact device can be obtained.

In a further aspect, the present disclosure provides a sensor comprising
 at least one radiation carrier for carrying at least a radiation beam, the radiation carrier comprising a surface,
 at least one excitation grating on the surface of the at least one radiation carrier, for directing at least an excitation radiation beam into a region of interest (ROI),
 at least one detector,
 at least one structure, for instance but not limited thereto, an emission grating or planar optics, for redirecting, e.g. reflecting, radiation from the region of interest into the at least one detector.

In example embodiments of the present disclosure, alignment of the optical system may be simplified or even avoided in a compact device.

In a sensor according to embodiments of the present disclosure, the at least one structure, e.g. emission grating of planar optics, positioned and adapted for redirecting, e.g. reflecting, radiation may be adapted to further collimate the redirected, e.g. reflected, radiation from the region of interest to the at least one detector. Collimation of the radiation allows as much radiation as possible to hit the detector, such that a usable amount of radiation for getting reliable results hits the detector.

In example embodiments of the present disclosure, the whole area of a detector may be used, improving its sensibility.

In a sensor according to embodiments of the present disclosure, the at least one structure, e.g. emission grating or planar optics, for redirecting, e.g. reflecting, radiation may be adapted to further focus the redirected, e.g. reflected, radiation from the region of interest to the at least one detector.

In example embodiments of the present disclosure, imaging and a good resolution can be obtained.

In a sensor according to embodiments of the present disclosure, the at least one radiation carrier may comprise planar optics for producing and directing a spread excitation radiation beam towards a region of interest.

In example embodiments of the present disclosure, a ROI may comprise a wide length or volume of a microfluidic channel, or a big area. A larger ROI can be created.

In example embodiments, integrating the focusing optics on the chip provides that the optics can be very nicely aligned with the microfluidics that are fabricated in the same process.

In a further aspect, the present disclosure provides a microfluidic device comprising a sensor according to any of the embodiments of the first aspect, and further comprises a substrate being transparent for at least the radiation beam, wherein the region of interest is defined. A microfluidic device according to embodiments of the present disclosure may furthermore be transparent for the redirected emission radiation.

In example embodiments of the present disclosure, an integrated optical sensor suitable for fluorescence analysis can be obtained.

In a microfluidic device according to embodiments of the present disclosure, the substrate may further comprise a microfluidic channel.

In example embodiments of the present disclosure, an inexpensive miniaturized flow cytometer requiring little maintenance can be obtained.

In a microfluidic device according to embodiments of the present disclosure, the at least one detector may be a detector array, and the microfluidic channel may be interlayered between the radiation carrier and the detector array.

In example embodiments of the present disclosure, a compact and simple flow cytometer can be obtained.

In a further embodiment, the present disclosure provides a system that comprises, as separate devices a microfluidic chip comprising
  at least one microfluidic channel, and
  at least one radiation carrier for carrying at least a radiation beam, the radiation carrier comprising a surface with at least one excitation grating, positioned and adapted to couple an excitation radiation signal directionally out of the radiation carrier thereby illuminating a pre-defined volume of the microfluidic channel, and at least one structure, e.g. emission grating or planar optics, positioned and adapted to redirect, e.g. reflect, emission radiation origination from the pre-defined volume; and
a readout device, adapted to be operatively coupled with the microfluidic chip, wherein the readout device comprises at least one detector for detecting the redirected emission radiation originating from the pre-defined volume, when the microfluidic chip and the readout device are operatively coupled.

In a system according to example embodiments of the present disclosure, sensitive detectors, which are more expensive, may be used. By having such sensor present in a separate readout device, the sensor can be reused, rather than being disposable. The use of sensitive detectors allows to do detection in a high throughput system.

Because of the detector not being on a disposable chip in these embodiments, hence the distance between the source of radiation and the detector, the emitted radiation must travel a distance which may be several mm to cm. Therefore the radiation may have to be collimated if a usable amount of radiation should hit the detector.

In a system according to embodiments of the present disclosure, the readout device may comprise a slot for receiving the microfluidic chip.

In yet another embodiment, the present disclosure provides a diagnostic device comprising a sensor according to embodiments of the present disclosure, and an output unit for providing an output of the sensor on which a diagnosis can be based. The output unit may be adapted for outputting a signal representative for presence/absence or concentration of an analyte in a pre-defined volume of the microfluidic channel.

In a further embodiment, the present disclosure provides a method of performing particle detection. The method comprises
  providing radiation scattering centers,
  inserting the radiation scattering centers within a region of interest,
  providing radiation from an excitation grating in optical contact with the region of interest,
  redirecting radiation scattered from radiation scattering centers in the region of interest, by means of at least one structure, e.g. emission grating or planar optics, to at least one detector, and
  monitoring emission of radiation redirected from the region of interest.

In example embodiments of the present disclosure, the use of flat optics such as planar waveguides, gratings and Fresnel lenses may reduce or avoid alignment steps, and less maintenance may be required.

In a method according to embodiments of the present disclosure, providing radiation scattering centers may comprise attaching radiation scattering centers to analytes.

In example embodiments of the present disclosure, luminescence, e.g. fluorescence, cytometry can be used with the present method.

In a method according to embodiments of the present disclosure, attaching radiation scattering centers may comprise attaching at least one type of luminophores, e.g. fluorophores, or chromatophores, or a mixture thereof.

In a method according to embodiments of the present disclosure, inserting scattering centers within a region of interest may further comprise providing a flow of scattering centers through the region of interest. In alternative embodiments, inserting scattering centers within a region of interest may comprise attaching analyte carrying scattering centers to affinity probes.

In example embodiments, scattering centers shall not be fixed to the affinity probe directly, hence the noise is substantially reduced as the majority of the detected signal may mainly stem from fixed analytes.

Particular aspects of the disclosure are set out in the accompanying independent and dependent claims. Features from the dependent claims may be combined with features of the independent claims and with features of other dependent claims as appropriate and not merely as explicitly set out in the claims.

These and other aspects of the disclosure will be apparent from and elucidated with reference to the embodiment(s) described hereinafter.

Figure 1:
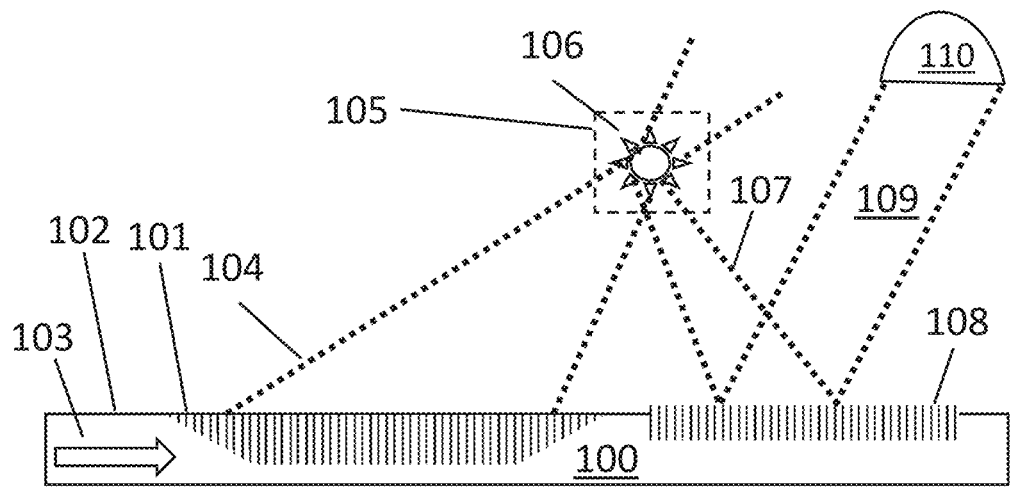
FIG. 1 illustrates a lateral view of a radiation carrier according to embodiments of the present disclosure, comprising, as an example only, and not intended to be limiting for the present disclosure, excitation and emission gratings, a region of interest (ROI) and at least one detector.

The drawings are only schematic and are non-limiting. In the drawings, the size of some of the elements may be exaggerated and not drawn on scale for illustrative purposes.

Any reference signs in the claims shall not be construed as limiting the scope.

In the different drawings, the same reference signs refer to the same or analogous elements.

DETAILED DESCRIPTION

The present disclosure will be described with respect to particular embodiments and with reference to certain drawings but the disclosure is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the disclosure.

The terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the disclosure described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the disclosure described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present disclosure, the only relevant components of the device are A and B.

Reference throughout this specification to "one embodiment" or "an embodiment" means that a particular feature, structure or characteristic described in connection with the embodiment is included in at least one embodiment of the present disclosure. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the disclosure, various features of the disclosure are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed disclosure requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those in the art. For example, in the following claims, any of the claimed embodiments can be used in any combination.

In the description provided herein, numerous specific details are set forth. However, it is understood that embodiments of the disclosure may be practiced without these specific details. In other instances, well-known methods, structures and techniques have not been shown in detail in order not to obscure an understanding of this description.

Where in embodiments of the present disclosure reference is made to "a particle" or "particles", this may refer to biological material such as, but not limited thereto, cells, exosomes, viruses.

Where in embodiments of the present disclosure, reference is made to "a fluid sample", this may refer to a fluid of a biological nature, e.g. a body fluid such as, but not limited to, blood, saliva, urine. The fluid sample may also refer to a fluid of a non-biological nature but suitable for transporting a particle as defined above, e.g. a saline solution.

Where in embodiments of the present disclosure reference is made to "planar laser beam", reference is made to a laser sheet, for example a laser beam spread and formed into a thin sheet by a long focal length spherical lens and a cylindrical lens. Any suitable system may be used. A "planar waveguide" is understood as a slab waveguide with substantially parallel flat surfaces, so the radiation travels inside via total internal reflection.

In embodiments of the present disclosure comprising planar waveguides, a grating (e.g. an out-coupling grating) may be provided on the walls of the planar waveguide, disrupting the internal reflection and producing a beam of radiation leaving the waveguide. This beam may be used as an excitation beam for analyzing samples or particles, and it is referred to as "excitation grating". Likewise, a grating that receives the beam after interaction with a sample or particle, and redirects it to a detector, e.g. reflects the radiation or couples the radiation into a waveguide, will be referred to as a "emission grating". However, the present disclosure is not limited to said waveguides, nor to optical lasers, nor to the presence of emission gratings. In the most general form, the radiation carrier comprises a structure for redirecting emission radiation emanating from the region of interest.

Where in embodiments of the present disclosure reference is made to "region of interest" or "ROI", reference is made to a predetermined region or volume of the space which can be occupied by a detectable specimen, such as a particle or a cell. In some embodiments of the present disclosure, the ROI comprises a portion of a microchannel, for example in a microfluidic device.

Where in embodiments of the present disclosure reference is made to "optical sensor", reference is made to a device suitable for sensing photons, for example using IR radiation, visible radiation, UV, etc.

Where in embodiments of the present disclosure reference is made to "luminescence of a target", reference is made to emission of radiation by the target, not resulting from thermal emission. Typically, in the context of the present disclosure, luminescence will be photoluminescence, generated by absorption of photons; such as fluorescence or phosphorescence. The present disclosure, however, is not limited to this type of luminescence, and can also be applied in case of, for instance, bioluminescence or chemiluminescence (emission as a result of a (bio)chemical reaction by an organism) or electroluminescence (a result of an electric current passed through the target).

Where in embodiments of the present disclosure reference is made to "Raman scattering on the target", reference is made to photons being scattered from the target when the latter is illuminated. Reference is made more particularly to inelastic scattering, where photons are scattered by an excitation, with the scattered photons having a frequency different from that of the incident photons. The Raman effect differs from the process of photoluminescence in that for the latter, the incident radiation is absorbed and the system is transferred to an excited state from which it can go to various lower states. The result of both processes is in essence the same: a photon with a frequency different from that of the incident photon is produced, and the molecule is brought to a different energy level. The major difference is that the Raman effect can take place for any frequency of incident radiation, while photoluminescence occurs only at a particular frequency of incident radiation.

Where in embodiments of the present disclosure, reference is made to "affinity probes", this refers to the substance having a certain affinity, e.g. a natural attraction, to the analyte, the substance having or not having a biological origin. By the expression "substance having a biological origin", we intend to mean a substance that is present or produced in a living organism, or has similar properties and/or structure and/or composition. For instance, the affinity probe may be an antibody, an antigen, an enzyme, a receptor, an aptamer, a nucleic acid aptamer, a peptide aptamer, or a molecularly imprinted polymer (MIP). In one aspect, the present disclosure relates to an optical sensor suitable for particle analysis, such as analysis via flow cytometry, the present disclosure not being limited thereto. The optical sensor comprises a radiation source, in example embodiments, a substantially coherent radiation source (e.g. laser). Radiation from the radiation source may be guided or transported by a waveguide. At least one excitation grating may be provided on the waveguide to direct the radiation beam towards a ROI, which may comprise a particle, a plurality of analytes in a flow of particles, etc. The radiation beam is made to interact with the at least one particle, which may be fluorescent in itself, or may be labeled with a fluorescent label. One or more structures, for instance emission gratings, may collect the radiation scattered from the ROI and redirect, e.g. reflect, it into at least one detector. The structures, e.g. emission gratings, may for example collimate the radiation from the ROI (upon redirecting, e.g. reflecting, it into one or more detectors), but the present disclosure is not limited to collimation, and alternatively the structures, e.g. emission gratings, may focus the redirected, e.g. reflected, radiation into one or more detectors.

In embodiments of the present disclosure, the radiation source couples radiation into a radiation carrier comprising at least one excitation grating, for outcoupling radiation from the radiation source. In some embodiments, the radiation carrier is optimized for carrying laser beams. In some embodiments, the radiation carrier may be waveguide, for example a strip or planar waveguide or a slab waveguide.

The excitation grating on the radiation carrier, e.g. waveguide, may be a focusing grating, or a grating providing e.g. a planar excitation beam, and it may be patterned as a grating coupler, the present disclosure not limited thereto. For example the focusing grating may comprise planar dielectric grating reflectors with focusing abilities, a Fresnel lens, etc. The excitation grating may be patterned, oriented or adapted to direct or focus radiation on a ROI, for example it may comprise gratings and patterns on the surface of a waveguide, so upon passage of a laser beam travelling in a radiation carrier, e.g. waveguide, the beam may exit the radiation carrier and be directed to, e.g. focused into, a ROI. The structure may be adapted to focus the radiation in a volume of substantially similar size as the expected cells. If the radiation is focused in a volume much smaller than a cell, the reliability of the detection system is reduced due to the strong variation of the signal. In embodiments of the present disclosure, on the other hand, the radiation is not necessarily focused on a volume smaller than a cell. A consistent illumination is obtained, which increases the reliability. Focusing radiation in a volume of size similar to the size of a cell may be done for instance by a dotted lens, which is a metalens formed by a structure of pillar elements in a close grid. A phase change is caused by passing the radiation through the pillar elements. The phase change can be very accurately tuned. Furthermore, the pillar design can be a good basis to create lenses with additional functionality, such as a strong spectral change. The excitation grating may also, instead of focusing, spread the radiation on a ROI (e.g. providing a planar laser beam), for example on a line or an area of a transparent conduit such as a microfluidic channel. It may comprise material suitable for transmission of the radiation, such as silicon nitride. In example embodiments, the control of illumination in the ROI reduces noise, because the ultimately detected signal may stem solely from the ROI and not from neighboring regions.

The radiation carrier, e.g. waveguide, comprises at least one structure, for instance an emission grating or planar optics, for redirecting, e.g. reflecting, any radiation emanating from the ROI to one or more detectors. In some embodiments, the redirected, e.g. reflected, radiation is collimated to the one or more detectors. Alternatively, the structure, e.g. gratings, may focus the radiation towards the one or more detectors, rather than collimating the radiation. In some embodiments of the present disclosure, radiation from the ROI may be laser radiation scattered for example by fluorescence, and it may be redirected, e.g. reflected, by the structure, e.g. emission grating, into one or more detectors. The one or more structures may comprise a Fresnel lens, or any suitable optical element.

The structure, e.g. emission grating, can be a dielectric reflector. In embodiments of the present disclosure, the structure, e.g. emission grating, may comprise reflective material such as metal, for example it may comprise a layer of reflective metal, or it can be formed by a combination of a dielectric grating and a reflective metal surface. For example, one or more structures, e.g. emission gratings, may be coplanar and may be located next to the excitation grating.

In accordance with embodiments of the present disclosure, a structure, e.g. an emission grating, can be used either in reflection mode or in transmission mode. When used in reflection mode, the detector will be located at a same side of the radiation carrier as the structure, e.g. emission grating. When used in transmission mode, the detector will be located at an opposite side of the radiation carrier compared to the structure, e.g. emission grating, and the detected radiation is sent substantially transversally through the radiation carrier to a detector. In the latter case, the structure, e.g. emission grating, may for instance be formed by a Fresnel lens that directs radiation to the other side of the radiation carrier.

In embodiments of the present disclosure comprising a planar waveguide, the at least one structure, e.g. emission grating, and the excitation grating may extend on a same surface of the waveguide. In some embodiments of the present disclosure, the structure may be implemented as an emission grating, and the emission grating and the excitation grating may be combined into a single grating region. Thus one continuous grating surface, comprising an emission grating and an excitation grating, may be formed, with optimized patterns in different zones for one or another behavior (obtaining excitation beam or reflecting radiation). Additionally, part of the continuous surface may comprise solely dielectric grating, while part of the surface (the emission gratings) may comprise an additional reflective layer such as a metal layer. The grating surface may have a homogeneous an inhomogeneous pattern in the whole surface. In embodiments of the present disclosure the same type of gratings can be used for the emission grating and the excitation grating. In such case, in particular Fresnel lenses can be used. Dielectric gratings can also be used, but since these are designed for particular wavelengths, they might cause more aberrations.

For example, a laser beam traveling through the radiation carrier may be transmitted through a grating acting as an excitation grating and may be focused on a ROI, in a point or on a line. Any radiation scattered by particles in the ROI may be reflected by the same grating surface, but by the section acting as an emission grating, into a detector. This may be possible by fine tuning of the patterning, for example.

In embodiments of the present disclosure, different zones of the structure positioned and adapted for redirecting emission radiation emanating from a region of interest, e.g. different zones of an emission grating, may be adapted to redirect, e.g. reflect, different parts of the spectrum, e.g. by adapting its grating, properties of a reflective layer, etc. Hence it is possible to include particle discrimination by redirecting, e.g. reflecting, signals from a first predetermined wavelength range to a first detector and from a further predetermined wavelength range to a different further detector. For example, a first type of scattering centers (e.g. a first type of fluorophores) may attach to a first type of analyte, while a further type of scattering centers (e.g. one or more different types of fluorophores) may attach to a further type of analyte. In this case, the first analyte may be detected by a first detector while the further analyte may be detected by a further detector. The signals from first and second analyte may e.g. be signals from different fluorescent markers, e.g. different fluorophores labelling correspondingly different types of cells, viruses, exosomes, etc.

Particle discrimination may be obtained alternatively or additionally by including a filter on the structure, e.g. emission grating, or on the detection system. With a diffractive grating, part of the filtering may be done by the grating itself. The at least one detector may be a plurality of detectors, such as specialized detectors, which may be only sensitive to a part of the spectrum, e.g. infrared or ultraviolet detectors, or detectors of radiation within a particular region of the visible range. According to some embodiments of the present disclosure, a plurality of different spectral filters, each filter having a different central wavelength, may filter the signal before it reaches a corresponding detector in a system with a plurality of detectors. In example embodiments, the plurality of detectors may be used to each detect a signal corresponding to a different part of the spectrum.

In example embodiments of the present disclosure, both excitation and collection systems may be aligned or at least roughly aligned, reducing or even avoiding calibration and alignment steps. Additionally, the system so built may be compact and low cost, as it does not require multiple pieces or complex assembling. In example embodiments, it may be implemented in medical devices, such as flow cytometry systems, and it may be easily applied in portable devices. For example, the sensor may be used in flow cytometry and an additional detector, collinear with the source of radiation and the ROI, may be used for counting particles and obtaining data regarding characteristic compound on a cell. Scattering date may be used to determine size. For biological applications, inorganic and organic dyes may be used. For example, one or more types of target cells, or viruses, or any other analyte, may be labelled with tagging antibodies comprising chromatophores, fluorophores, etc.

Some embodiments of the present disclosure may be applied to detect and analyze quantum dots, for example using UV laser. This may be useful in biological analysis (quantum dots as tagging particles), but it may also be used in semiconductor technology. In general, the present disclosure may suitable be for fields of technology involving optical analysis of particles.

Some embodiments of the sensor of the present disclosure are described with reference to FIG. 1, FIG. 2 and FIG. 4, FIG. 5.

In what follows, particular embodiments of the present disclosure are described. These often refer to "waveguides" rather than the broader "radiation carrier", to "emission gratings" rather than the broader "structure", and to "reflecting" rather than the broader "redirecting". This way of describing is done for the purpose of understandability and fixing the mind, and is in no way intended to be limiting for the present disclosure.

FIG. 1 shows a lateral view of a radiation carrier 100, such as a waveguide, comprising a grating 101 on its top surface 102. The radiation carrier 100 may be an optical fiber, or a rectangular waveguide. The radiation carrier 100 may be made from any suitable material, such as for instance glass, polymer or suitable semiconductor material. Radiation 103, emanating from a radiation source (not illustrated) is coupled into the radiation carrier 100, and travels there through, for instance by total internal reflection, until it exits through an excitation grating 101. The thus exciting excitation beam 104 may be adapted for being focused into a ROI 105, which in the figure illustrated contains a particle 106, for example a cell. The grating 101 may be adapted to focus the beam 104 into the whole ROI, or more than half of the ROI, or into a volume of the same order of magnitude as the particles to be analyzed, for example a volume of one or more cells. The radiation 107 scattered from the particle 106 present in the ROI 105, for example scattered by fluorescence, falls into an emission grating 108, where it is reflected and collimated, such that the reflected and collimated beam 109 is suited for entering a detector 110.

In the embodiment illustrated in FIG. 1, only one emission grating is shown, but the disclosure is not limited thereto, and also encompasses embodiments with more than one emission grating.

Figure 2:
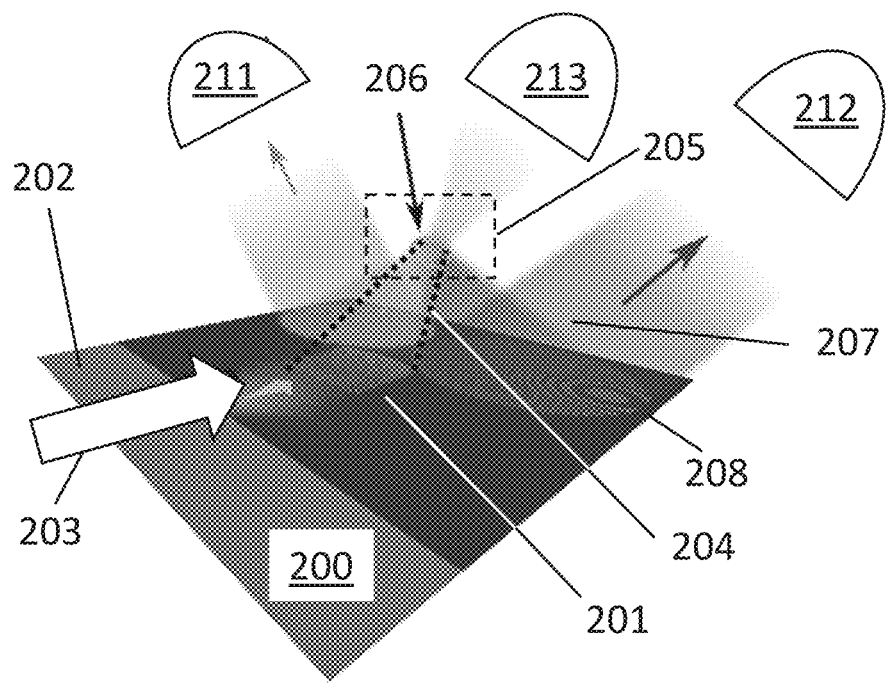
FIG. 2 illustrates a schematic perspective view of a planar waveguide according to embodiments of the present disclosure, comprising, as an example only, and not intended to be limiting for the present disclosure, excitation and emission gratings, a ROI, two detectors and a forward-scattering detector.

FIG. 2 shows a perspective view of a planar waveguide 200 comprising an excitation grating 201 on the waveguide surface 202, with a radiation signal 203 travelling within the waveguide 200, for example via total internal reflection. The excitation grating 201 disturbs the surface 202 of the planar waveguide 200, and radiation escapes from the waveguide 200, thus forming an excitation beam 204. The excitation grating 201 has a pattern that allows focusing the excitation beam 204 on a ROI 205. When the radiation in the ROI 205 encounters a fluorescent analyte 206, e.g. an analyte such as a cell showing fluorescence (e.g. by attachment of fluorescent markers), it scatters radiation which is reflected and collimated in one or more emission gratings 208. If there are a plurality of emission gratings 208, they may be located at either side of the excitation grating 201, for instance the plurality of emission gratings 208 may surround the excitation grating 201. The plurality of emission gratings 208 may be evenly or unevenly distributed around the excitation grating 201. The radiation 207 reflected and optionally collimated by the emission gratings 208, enters a couple of detectors 211, 212. In particular embodiments of the present disclosure, rather than being collimated, the radiation reflected by the at least one emission grating 208 may be focused onto a detector surface.

In some embodiments of the present disclosure, a further (optional) forward-detector 213 may be placed so as to detect a shadow as a hologram of the cells moving through the ROI. The forward detector 213 detects along the same axis as the incoupled excitation beam 204. In embodiments of the present disclosure, the signal from the forward detector 213 can be used as comparative signal (e.g. to detect whether a particle 206 or analyte passes through the ROI 205), or as an indication of the size of the particle 206 or analyte in the ROI 205. This may be used for distinguishing different bodies passing through the ROI 205, for example for distinguishing bodies with attached luminophores, e.g. fluorophores, from unattached luminophores, e.g. fluorophores.

The patterns of the gratings in accordance with embodiments of the present disclosure, e.g. the excitation and/or emission gratings, may be made so as to spread, collimate or focus the radiation. Different types of gratings (excitation grating, emission grating) may have a different characteristic. For example, the excitation gratings 101, 201 of FIG. 1 and FIG. 2 may be adapted (e.g. patterned, by adding a lens system, by forming a Fresnel lens, etc.) for focusing the excitation beam 104, 204 which exits the radiation carrier 100, 200, into the ROI 105, 205. In embodiments of the present disclosure, no extra patterning, like an extra Fresnel pattern, is needed to focus the excitation beam 104, 204 coupled out of the waveguide, as the excitation grating per se can do the job.

At the same time, the one or more emission gratings 108, 208 of FIG. 1 and FIG. 2 may be patterned for collimating the reflected radiation 107, 207 into the detectors 211, 212. Collimation using emission gratings 108, 208 can be highly accurate.

Figure 3:
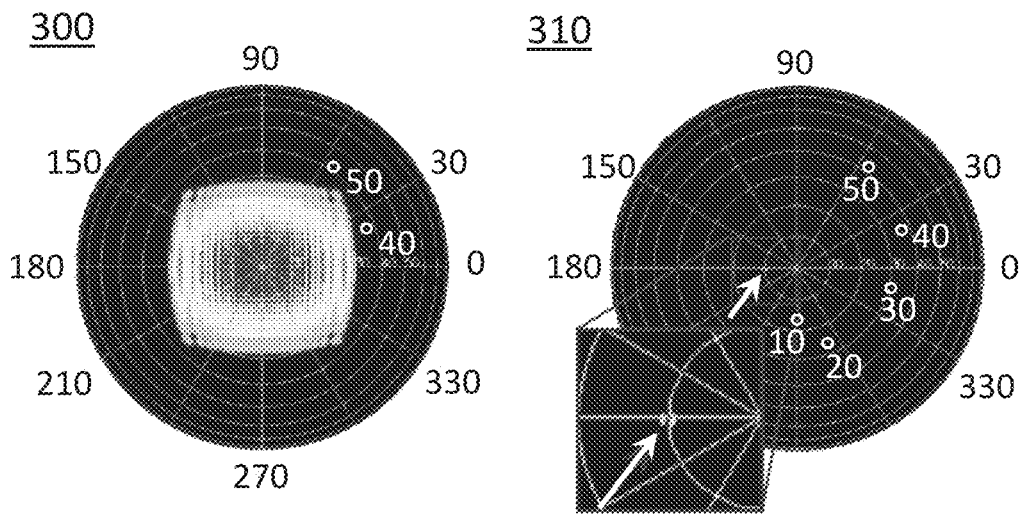
FIG. 3 shows a model of the angular distribution of the radiation from an oscillating dipole radiator before and after incidence on a collimating holographic detector.

The diagrams of FIG. 3 show a model of the angular distribution of radiation from an oscillating dipole radiator, which can be used for modelling a point source radiator, e.g. a Raman scattering molecule or a luminescent molecule such as e.g. a fluorescent molecule. The left diagram 300 of FIG. 3 shows the angular distribution of the radiation reaching the emission grating. It is spread over an angle between approximately 35° (on the 45° direction) and 25° (on the 90° direction). On the other hand, the right hand diagram 310 of FIG. 3 shows the angular distribution of the radiation after being reflected and collimated by the emission grating. The angular distribution of the radiation is concentrated in a single direction, at 10°.

Figure 4:
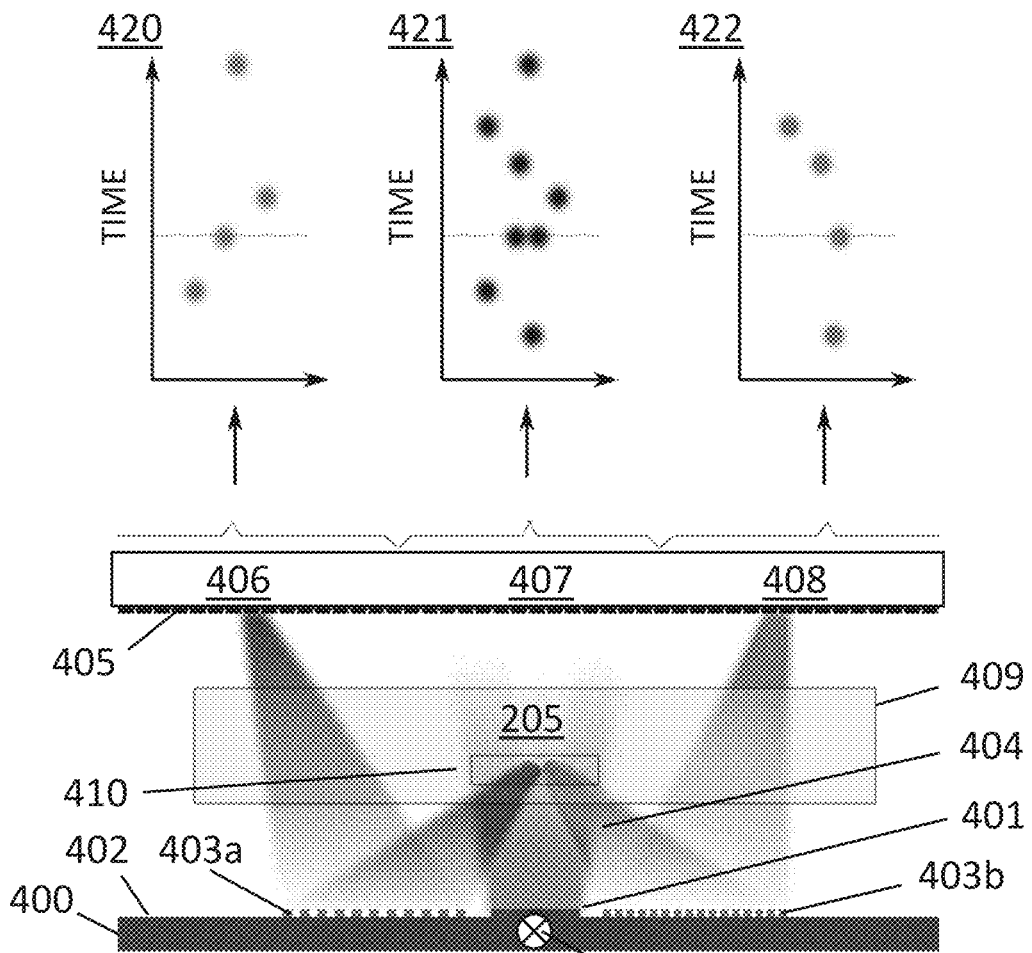
FIG. 4 illustrates the front view of a planar waveguide according to embodiments of the present disclosure, with spread excitation gratings and focusing emission gratings, a system for introducing analytes in the ROI and three diagrams showing the results in time of the forward-scattering detector and the detectors receiving radiation from the emission gratings.

The present disclosure also encompasses types of excitation and emission gratings other than the ones shown in FIG. 1 and FIG. 2. For example, FIG. 4 shows a front view of a planar waveguide 400 comprising an excitation grating 401 on a surface 402, surrounded by a first and second emission gratings 403a, 403b. FIG. 4 also schematically illustrates a radiation signal 203 traveling within the waveguide 400. In the embodiment illustrated, the excitation grating 401 spreads the exiting excitation beam 404 on the ROI 205. For example, the spread excitation beam 404 may be planar and may extend over a length defining the ROI 205, for instance it may span the width of the microfluidic channel. In the embodiment illustrated in FIG. 4, emission gratings 403a, 403b (for collecting radiation reflected from the ROI and sending it to detectors) are designed to focus the radiation in a point on a detection surface. When the radiation in the ROI 205 encounters a scattering center (e.g. a fluorescent analyte), the scattered radiation is collected in the first and second emission gratings 403a, 403b. The emission gratings 403a, 403b may each reflect radiation of the complete spectrum, or they may reflect radiation within a first range of wavelengths and a second range of wavelengths, respectively. The radiation falling on the first and second emission gratings 403a, 403b may be reflected and focused (instead of being collimated) and sent into detectors such as the ones of FIG. 2 or into a detector array 405 like the one shown in FIG. 4. The detector array 405 may comprise a plurality of detecting regions 406, 407, 408, for example a plurality of regions 406, 408 for detecting radiation scattered from the ROI and a region 407 for detecting shadows as a hologram of the particles moving in the ROI 205. Hence, the lateral position of cells in a ROI can be obtained as an image, for example. The shadow of the excitation line that falls on detecting region 407 can be used to verify the particles and possibly to do a size measurement.

FIG. 1 and FIG. 2 illustrate embodiments with a focusing excitation grating and one or more collimating emission gratings. FIG. 4 illustrates an embodiment with a spreading excitation grating and a plurality of focusing emission gratings. However, this is not intended to be limiting for the present disclosure, and also other combinations of types of excitation gratings and emission gratings are envisioned to be part of the present disclosure. For instance, in accordance with embodiments of the present disclosure, any suitable type of excitation grating (e.g. focusing, collimating, spreading) can be combined with any suitable type of emission grating (e.g. focusing, collimating, spreading).

Embodiments of the first aspect of the present disclosure may further comprise microfluidic channels, for example a microfluidic chip in combination with a radiation carrier, excitation and emission gratings and optionally any planar or strip optics, and one or more detectors. The one or more detectors can be integrated in the microfluidic chip. For example, the imager can be on top of the microfluidic chip.

An example of embodiments comprising a microfluidic channel is shown in FIG. 4, in which a transparent substrate 409 comprises a microfluidic channel 410. The region of the channel 410 illuminated by the excitation radiation 404, comprises the ROI 205. In the case illustrated, the excitation grating 401 spreads the radiation over substantially the whole of the width of the channel 410, optimizing the ROI 205 within the channel 410. The radiation may be spread e.g. in a planar sheet, for example a planar laser beam, although the present disclosure is not limited thereto. If a particle, e.g. a fluorescent marker attached to an analyte, crosses the ROI 205, excitation radiation is scattered on or by the fluorescent marker. Back-scattered radiation from the ROI 205 is in this case reflected and focused by the emission gratings 403a, 403b into a point just above the microfluidic chip, e.g. into the zones 406, 408 of a detector array 405, which may be a line array, a camera, etc. The transparent substrate 409 may further focus the radiation reflected by the emission gratings. This configuration may simplify the microfluidics as well as increase the throughput. The detectors may be placed a few millimeters away from the emission grating, or at least a distance enough to allow the definition of a ROI (e.g. allow the placement of microfluidic channels for defining a ROI).

The three diagrams 420, 421 and 422 at the top of FIG. 4 show the signal measured by the detector array region 406 on the left, the region 407 on the center and the region 408 on the right, respectively, as a function of time. The central diagram 421, the shadow or hologram region, would detect the passing of particles (e.g. via forward-scattering). The left diagram 420 may detect one type of scattering centers, e.g. red fluorophores attached to a first type of analytes, while the right diagram 422 may detect a second type of scattering centers, e.g. green fluorophores attached to a second type of analytes. The analysis of the graphs produces a reconstruction of the particles flowing through the channel, in addition to the fluorescent signal that matches these particles.

Figure 5:
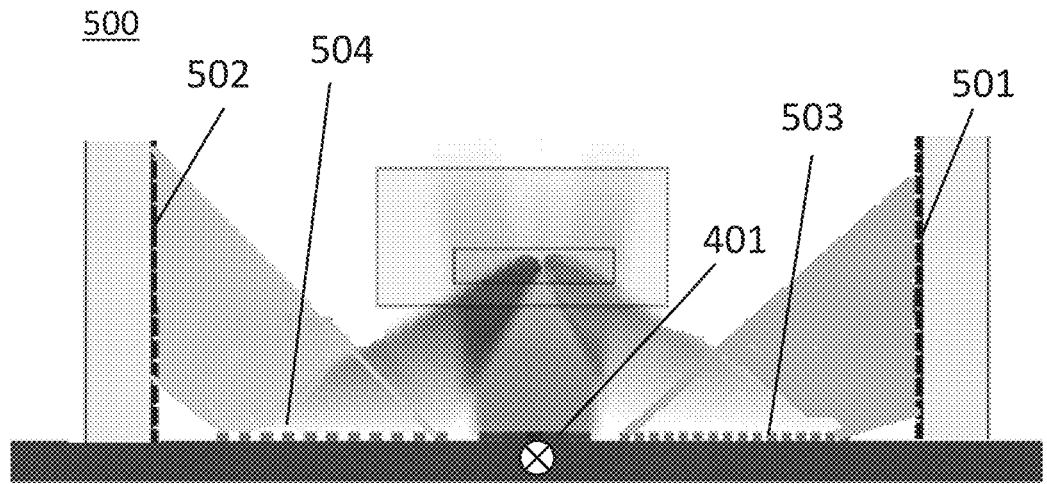
FIG. 5 illustrates the front view of an alternative arrangement of detectors with respect to the gratings, according to embodiments of the present disclosure.

The present disclosure is not limited to the distribution of optical elements as illustrated in FIG. 4. For example, rather than being place above (in a direction of excitation of radiation) a radiation carrier, as illustrated in FIG. 4, detector arrays may be placed aside the radiation carrier, e.g. waveguide, as illustrated in FIG. 5. In such embodiments, rather than having a unique array of detectors in a single plane, a plurality of detectors planes may be available.

FIG. 5 shows two detector arrays 501, 502 substantially perpendicular to the surface of the radiation carrier 400 containing the excitation grating 401 (e.g. a grating for spreading the beam as in FIG. 4) and the emission gratings 503, 504 (e.g. collimating gratings).

The radiation scattered from the ROI 205 may be collected in the detector arrays 501, 502 after reflection by the emission gratings 503, 504 (focused or, as shown in the image, collimated). This geometry may avoid circuitry or other elements in the top part of the circuit. For instance, analytes may be introduced through the top of the device into the ROI 205, instead of through the zone between the excitation grating 401 and the detector array. For example, the embodiment of FIG. 5 may comprise affinity probes in the ROI 205.

In embodiments of the present disclosure, the microfluidics are provided, e.g. patterned, in or on top of a chip (e.g. a CMOS chip) and are closed by a transparent cover, so that the radiation (e.g. light) reflected by the emission gratings can reach at least one detector. The microfluidics may force a fluid comprising particles through a channel comprising the ROI, for instance by capillary action or driven e.g. by using pumps or similar, so that the particles interact with the focus spot of the excitation grating and emission gratings. Embodiments of the present disclosure may further comprise a first and a second microfluidic compartment fluidically interconnected via at least one micro-fluidic channel comprising a ROI. The second micro-fluidic compartment may comprise or may be connected to a capillary pump for pumping a fluid sample from the first to the second microfluidic compartment via the at least one microfluidic channel. The chip may comprise also an on-chip radiation source such as a light source, optically coupled to the radiation carrier (e.g. a waveguide).

Embodiments of the first aspect of the present disclosure have been described where particles to be detected or analyzed are in flow. Alternative embodiments of the present disclosure may comprise a substrate comprising affinity probes suitable for binding the particles under interest, for being investigated in a static situation. In these embodiments, analytes are fixed to at least a portion of a substrate provided with relevant affinity probes, e.g. antibodies, antigens, enzymes, receptors, aptamers, nucleic acid aptamers, peptide aptamers or molecularly imprint polymers (MIP). At least a portion of the substrate comprising thus fixed analytes is placed in the ROI. The analytes, as before, may further comprise one or more types of attached scattering centers. In example embodiments, scattering centers not bound to analyte to be investigated shall not be fixed to the affinity probes, hence the noise is substantially reduced as the majority of the detected signal may mainly stem from fixed analytes.

Further embodiments of the present disclosure may comprise a waveguide and multiple excitation gratings, for irradiating, e.g. illuminating, multiple ROIs, e.g. in a single or a plurality of microfluidic channels (e.g. comprising particles attached to different types of luminophores, e.g. fluorophores), or in a plurality of affinity probes. This allows reducing power consumption because only one radiation source may be needed.

Other features may be included, such as coupling gratings, tapers, lenses like Fresnel lenses, microlens arrays, etc.

Figure 6:
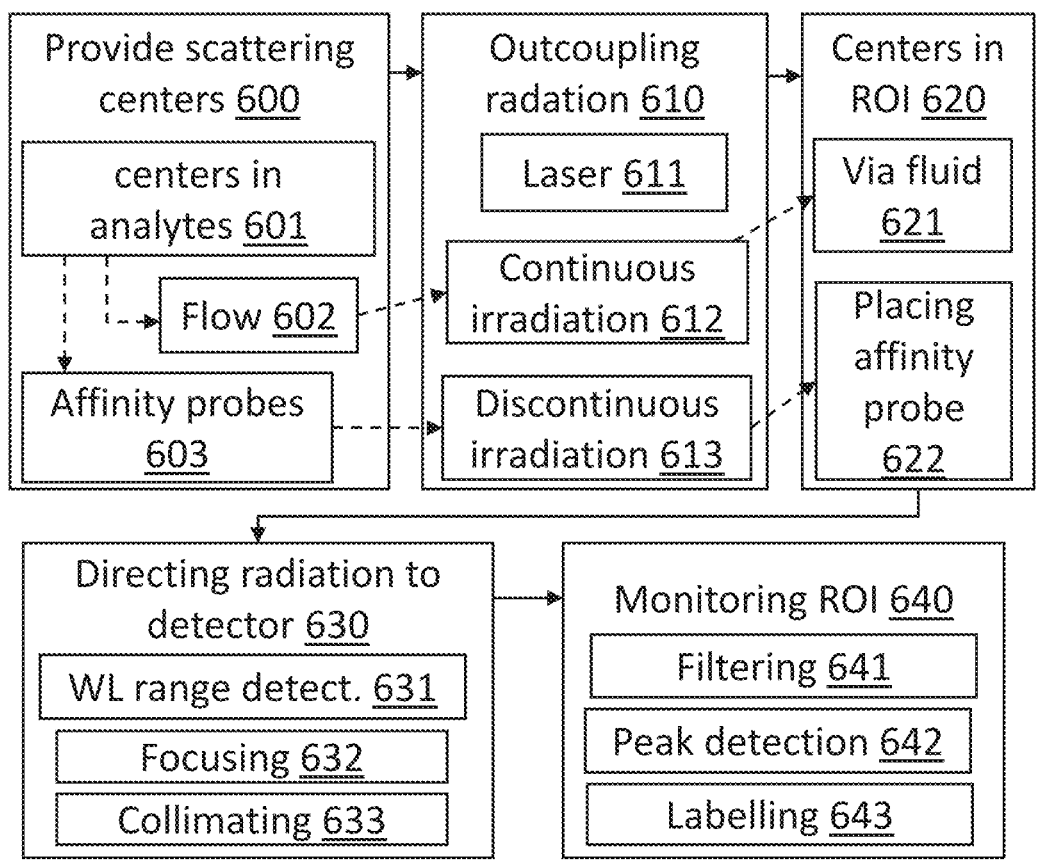
FIG. 6 illustrates a flowchart of method according to embodiments of the present disclosure.

In a second aspect, the present disclosure relates to a method of performing particle detection. The method is suitable for detecting analytes, e.g. Raman scattering particles or luminophore labeled particles, such as fluorophore labelled particles, although the present disclosure is not limited thereto. The method includes irradiating particles or cells in a ROI (e.g. a volume of the same order of magnitude of the particles or cells to be analyzed), for example using an excitation grating for producing emission of radiation characteristic of the particle or cell, collecting that emitted radiation in at least one grating, and sending (e.g. by reflection) said radiation to a detector (e.g. optical detector, fluorescence detector, etc.). The method will be described with respect to the flowchart of FIG. 6.

In a first step, providing 600 scattering centers may comprise providing particles that scatter radiation within a particular wavelength range, for example laser radiation. The scattering centers may for instance be fluorescent labels. The scattering centers may be attached 601 to analytes. For example different types of scattering centers, having the feature of radiation scattering at different wavelengths, may be attached to different types of analytes. For example, one type of scattering center may be attached to tumor cells while others may be attached to healthy cells.

The scattering centers may be present in a fluid, such as blood, urine, saliva, buffer, a solution, etc., and providing scattering centers may comprise binding scattering centers to analyte while the analyte is present in the bulk of a liquid, optionally in flow. Alternatively, the analyte may be bound to affinity probes, and providing scattering centers may comprise binding scattering centers to analyte bound to affinity probes.

A further step comprises outcoupling 610 radiation from a radiation carrier, via an excitation grating. Providing radiation may comprise providing 611 laser radiation, with a wavelength for example between IR and UV wavelengths. The type of radiation and its characteristics can be selected to obtain a suitable scattering of the scattering centers, for example via fluorescence. The radiation may be provided continuously or discontinuously. For example, in embodiments comprising providing 602 a flow of analytes, continuous radiation 612 may be provided, while in embodiments comprising attaching 603 analytes to affinity probes, it may be feasible to provide 613 discontinuous, e.g. pulsed radiation.

A further step comprises inserting 620 the scattering centers within a ROI. For example, they may be introduced 621 in a fluid through a microfluidic channel (in flow), or affinity probes may be placed 622 in the ROI, to which analyte under interest has bound or may bind.

The interaction of the radiation beam from the excitation grating with the scattering centers will produce scattered radiation, e.g. fluorescence, which shall be collected and directed 630 from the ROI, via emission gratings, to at least one detector. Directing 630 radiation from the ROI to a detector may comprise directing 631 radiation within a predetermined wavelength range to a predetermined detector, and radiation within a further predetermined wavelength range to another predetermined detector. Additionally, the reflection in the emission grating may comprise either focusing 632 or collimating 633 the radiation to the at least one detector.

A further step comprises monitoring 640 emission of radiation from the ROI. This step comprises monitoring emissions reflected by the one or more emission gratings, and it may further comprise monitoring forward scattered radiation. For the step of monitoring 640 any suitable technique may be used, such as photoelectric cells, analog to digital converters, outputs, etc. Additionally, a step of filtering 641 radiation within a predetermined range of wavelengths may be included, for example a threshold filter, chromatic filter, polarization filter, etc. Further steps such as performing 642 peak detection or labelling 643 scattering centers may be applied.

Different particles may present a different response to the same radiation. It is possible to discern between different responses in embodiments of the present disclosure, e.g. by use of filters for filtering the radiation impinging on the detectors. For example, some embodiments of the present disclosure may comprise laser-induced fluorescence. In such embodiments, different types of luminophores, e.g. fluorophores, may be used wherein each type has a different wavelength range. To differentiate between radiation signals having different wavelength ranges, different spectral filters may be used in the detector or detectors to filter the emission radiation signal. In example embodiments, detection of emission radiation may be performed more efficiently. For example, a peak in the emission radiation signal may be detected more efficiently.

For example, when at least two types of luminophores, e.g. fluorophores, are used to label a particle, a single emission waveguide may be optically connected to an optical detector having at least two spectral filters. The optical detector may comprise at least two photodiodes, each photodiode being covered with a different spectral filter. Luminescence, e.g. fluorescence, falling onto the optical detector is filtered by each spectral filter before being detected. This gives rise to at least two luminescence, e.g. fluorescence, signals which may be correlated to improve peak detection.

The present disclosure may be used for cytometry, like flow cytometry. It may be applied to immunophenotyping, ploidy analysis, cell counting or GFP expression analysis. The method and device allow for luminescent flow cytometry, e.g. fluorescent flow cytometry, as a compact and low cost device is obtained, which may be integrated in a chip. It may be easy to use, as it requires little alignment and it is easy to implement in medical devices, either as a microfluidic device or with affinity probes.

In embodiments of the present disclosure, the sensor comprising both the radiation carrier with the at least one excitation grating, the at least one structure positioned and adapted for redirecting emission radiation emanating from a pre-defined volume, and the at least one detector may be integrally built, i.e. may be a single device. Alternative embodiments of the present disclosure, however, also cover a system comprising different separable parts, e.g. a sample analyzing device and a readout device. The sample analyzing device may be a microfluidic chip comprising at least one microfluidic channel for transporting a fluid sample through the system, and at least one radiation carrier for carrying a radiation beam. The radiation carrier comprises, for instance on a surface thereof, at least one excitation grating, positioned and adapted to couple the excitation radiation signal carried by the radiation carrier directionally out of the radiation carrier thereby illuminating a pre-defined volume of the microfluidic channel, and at least one structures such as for instance an emission grating, positioned and adapted to redirect, e.g. reflect, emission radiation origination from the pre-defined volume. The readout device may comprise at least one detector, for instance a detector array, for detecting the redirected, e.g. reflected, emission radiation originating from the pre-defined volume. The readout device may be adapted, for instance may be provided with a slot, for receiving the sample analyzing device. The sample analyzing device may have the shape and size of an SD card, for instance the shape and size of a micro-SD card or similar. The sample analyzing device may include a radiation source, e.g. a light source, for coupling radiation into the radiation carrier. Alternatively, the radiation source may be provided on or in the readout device, such that radiation may be coupled into the radiation carrier of the sample analyzing device, when the sample analyzing device and the readout device are operatively coupled to one another. Device features of the system comprising different separable parts are as explained in the embodiments of the integrally built device, and are not repeated here for sake of conciseness.

What is claimed is:

1. A sensor comprising:
   at least one waveguide comprising:
      a surface;
      at least one excitation grating on the surface of the waveguide, positioned and adapted to couple an excitation radiation beam directionally out of the waveguide, thereby illuminating a region of interest; and
      first and second emission gratings on the surface of the waveguide adjacent to and surrounding the at least one excitation grating, the first and second emission gratings positioned and adapted for redirecting emission radiation emanating from the region of interest, wherein the waveguide is adapted for carrying at least a radiation beam; and
   at least one detector,
   wherein the first and second emission gratings are positioned and adapted for redirecting the emission radiation from the region of interest into the at least one detector.

2. A microfluidic device comprising a sensor according to claim 1, further comprising a substrate being transparent for at least the radiation beam wherein the region of interest is defined.

3. The microfluidic device according to claim 2, wherein the substrate is furthermore transparent for the redirected emission radiation.

4. The microfluidic device according to claim 2, wherein the substrate further comprises a microfluidic channel.

5. The microfluidic device according to claim 4, wherein the at least one detector is a detector array, and wherein the microfluidic channel is interlayered between the waveguide and the detector array.

6. The microfluidic device according to claim 2, further comprising:
   a microfluidic chip comprising at least one microfluidic channel,
   wherein the at least one excitation grating is positioned and adapted to couple an excitation radiation signal directionally out of the waveguide thereby illuminating a pre-defined volume of the microfluidic channel, and the first and second emission gratings, positioned and adapted to redirect emission radiation originating from the pre-defined volume; and
   a readout device, adapted to be operatively coupled with the microfluidic chip, wherein the readout device comprises at least one detector for detecting the redirected emission radiation originating from the pre-defined volume, when the microfluidic chip and the readout device are operatively coupled.

7. The microfluidic device according to claim 6, wherein the readout device comprises a slot for receiving the microfluidic chip.

8. A diagnostic device comprising a sensor according to claim 1, and an output unit for providing an output of the sensor on which a diagnosis can be based.

9. The sensor according to claim 1, wherein the first and second emission gratings are adapted to couple the emission radiation to another waveguide.

10. The sensor according to claim 9, wherein the another waveguide is positioned in the plane of the first waveguide or angled thereto.

* * * * *